(12) United States Patent
Berger et al.

(10) Patent No.: US 10,833,377 B2
(45) Date of Patent: Nov. 10, 2020

(54) COOLING DEVICE AND ENERGY STORE

(71) Applicant: Dr. Ing. h.c. F. Porsche Aktiengesellschaft, Stuttgart (DE)

(72) Inventors: Dennis Berger, Bietgheim-Bissingen (DE); Michael Werner, Besigheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 1072 days.

(21) Appl. No.: 14/961,922

(22) Filed: Dec. 8, 2015

(65) Prior Publication Data

US 2016/0172724 A1    Jun. 16, 2016

(30) Foreign Application Priority Data

Dec. 11, 2014    (DE) .................... 10 2014 118 402

(51) Int. Cl.
*H01M 10/6551*    (2014.01)
*H01M 10/613*    (2014.01)
*H01M 10/6554*    (2014.01)
*H01M 10/625*    (2014.01)
*H01M 10/655*    (2014.01)

(52) U.S. Cl.
CPC ..... *H01M 10/613* (2015.04); *H01M 10/6551* (2015.04); *H01M 10/6554* (2015.04); *H01M 10/625* (2015.04); *H01M 10/655* (2015.04)

(58) Field of Classification Search
None
See application file for complete search history.

(56) References Cited

U.S. PATENT DOCUMENTS

2009/0111009 A1    4/2009  Goesmann et al.

FOREIGN PATENT DOCUMENTS

| DE | 10 2008 053 311 | 4/2009 |
| DE | 20 2007 017 390 | 5/2009 |
| DE | 10 2008 034 862 | 1/2010 |
| JP | 2013246990 A | 12/2013 |
| KR | 20130013947 A | * 2/2013 |
| KR | 1020130013947 | 2/2013 |

OTHER PUBLICATIONS

Nishikawa et al. (JP 2013246990 A)—machine translation.*
Lee et al. (KR 20130013947 A)—see machine translation.*
German Search Report dated Nov. 3, 2015.
Korean Office Action.

* cited by examiner

*Primary Examiner* — Haixia Zhang
(74) *Attorney, Agent, or Firm* — Gerald E. Hespos; Michael J. Porco; Matthew T. Hespos

(57) ABSTRACT

A cooling device is provided for an energy store that has an energy storage module. The cooling device has at least one cooling element and one spring fin. The spring fin is arranged on and coupled to the cooling element. The spring fin is configured to carry heat from the energy storage module to the cooling element.

9 Claims, 3 Drawing Sheets

COOLING DEVICE AND ENERGY STORE

CROSS REFERENCE TO RELATED APPLICATION

This application claims priority under 35 USC 119 to German Patent Appl. No. 10 2014 118 402.5 filed on Dec. 11, 2014, the entire disclosure of which is incorporated herein by reference.

BACKGROUND

1. Field of the Invention

The invention relates to a cooling device for an energy store and to an energy store.

2. Description of the Related Art

Electrical energy stores for a drive system of a motor vehicle have energy storage cells arranged in stacks to form an energy storage module. The stacked arrangement prevents heat from being dissipated from the energy storage cells during operation of the energy store.

An object of the invention is to provide an improved cooling device and an improved energy store comprising a cooling device.

SUMMARY

The invention relates to cooling device and to an energy store that has a cooling device and at least one energy storage module. The cooling device is designed to cool the energy storage module. The cooling device has at least one cooling element and a spring fin that is coupled to the cooling element. The spring fin is arranged between the cooling element and the energy storage module and bears against the energy storage module at least in sections. The spring fin is designed to carry heat from the energy storage module to the cooling element. As a result, a particularly lightweight energy store can be provided. Furthermore, the energy storage module can be removed during disassembly of the energy store more easily than in the case of conventional energy stores since no filler has to be removed from the energy store.

The spring fin may have a first section, a second section adjoining the first section, and a third section adjoining the second section. At least one of the first and third section is coupled to the cooling element. In this way, tolerance compensation between the cooling element and the energy storage module is performed by the spring fin.

At least one of the first and second sections may be rectilinear at least in sections. Additionally or alternatively, the second section may be arcuate.

In a further embodiment, at least one of the first section and third sections is connected to the cooling element in a cohesive manner to ensure that the spring fin is not removed unintentionally from its assembly position during assembly of the energy store.

The cooling element may have at least one first receptacle and a second receptacle spaced from the first receptacle. The first section engages into the first receptacle, and the third section engages into the second receptacle.

Each receptacle may have two sections that are oblique or perpendicular to one another. One section of each receptacle may be parallel to a side surface of the cooling element. The first and third sections of the spring fin may be arranged in the sections of the receptacles that are parallel to the side surface of the cooling element In a further embodiment, the energy storage module comprises at least one energy storage cell. The cooling device comprises a further cooling element and a further spring fin. The further spring fin is arranged on the further cooling element on a side of the further cooling element that faces the cooling element. The energy storage cell is arranged between the two spring fins.

The cooling device may have at least one cooling plate, and the cooling element may be connected to the cooling plate. The energy storage module can be coupled thermally to the cooling plate. In this way, the heat that is introduced into the cooling element can be dissipated via the cooling plate to avoid overheating of the cooling element and to ensure reliable cooling of the energy storage module.

The invention also relates to an energy store that comprises an energy storage module and the above-described cooling device. The energy storage module has at least one energy storage cell and the spring fin is designed to carry heat from the energy storage module to the cooling element.

The energy store may have a further cooling element and a further spring fin. The further spring fin is arranged on the further cooling element opposite that side of the further cooling element that faces the cooling element. Thus, the energy storage cell is arranged between the two spring fins.

The invention is explained in greater detail below with reference to figures.

DETAILED DESCRIPTION

Figure 1:
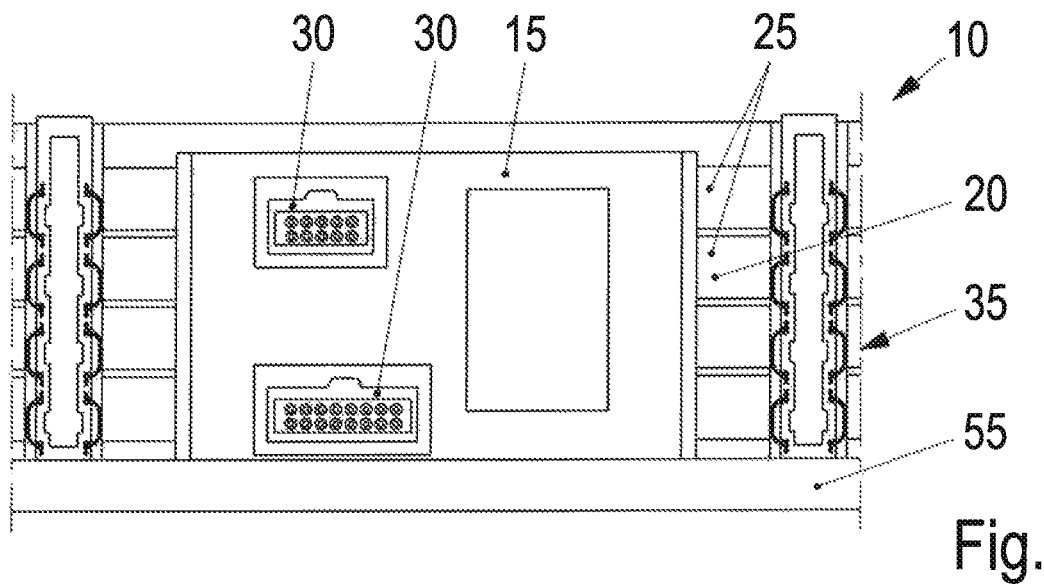
FIG. 1 is a plan view of an energy store according to a first embodiment.
Figure 2:
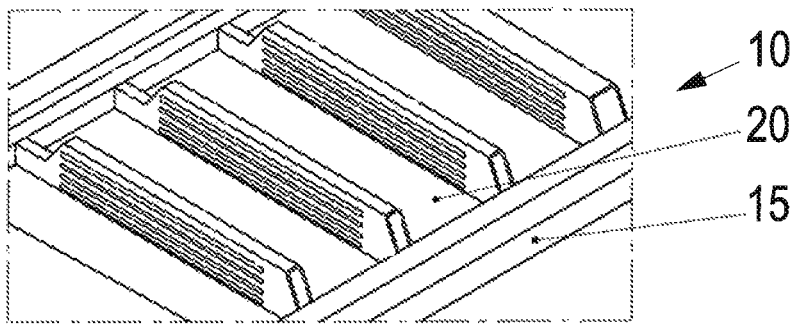
FIG. 2 is a perspective view of part of the energy store shown in FIG. 1.
Figure 3:
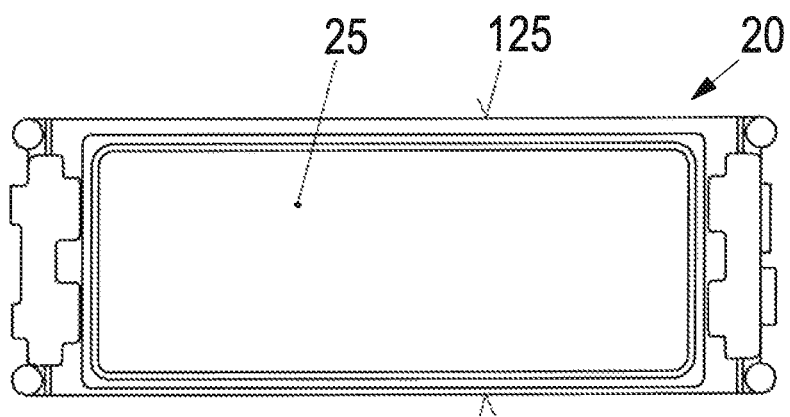
FIG. 3 is a side view of an energy storage module of the energy store shown in FIGS. 1 and 2.
Figure 4:
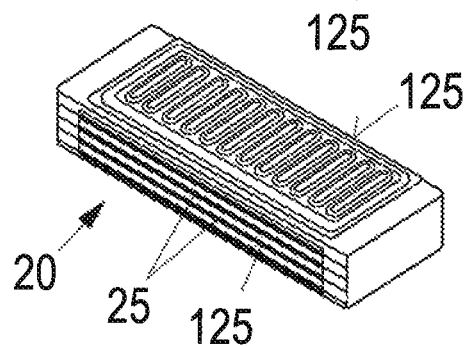
FIG. 4 is a perspective view of the energy storage module of FIG. 3.

FIG. 1 is a plan view of an energy store 10 according to a first embodiment. The energy store 10 has a housing 15 and an energy storage module 20 arranged in the housing 15. The energy storage module 20 has plural energy storage cells 25 arranged in stacks in the housing 15. The energy store 10 also comprises plural connections 30, at least some of which are electrically connected to the energy store 20. The connections 30 provide an electrical connection to a controller of a power drive of the motor vehicle.

The energy store 10 further has a cooling device 35. The cooling device 35 functions as a heat sink that dissipates heat from the energy storage module 20 to avoid overheating of the energy storage module 20 and to keep the energy storage module 20 in an optimum temperature operating range.

The energy storage cell 25 is in the form of a pouch cell, for example, and has a connection element 40 for mechanically connecting the energy storage cell 25 to an adjacent energy storage cell 25. The energy storage cells 25 also are electrically contact-connected to one another. In this case, the number and the arrangement of energy storage cells 25 depends on a desired electrical voltage of the energy storage module 20 and a desired current intensity that can be output by the energy storage module 20. Depending on the configuration of the motor vehicle as a hybrid or electric vehicle, the energy storage cells 25 are combined to form the energy storage module 20 for high-voltage applications in the motor vehicle, and particularly to store electrical energy for a drive system of the motor vehicle. In this embodiment, the energy storage module 20 has a substantially cuboidal configuration, by way of example.

The cooling device 35 has first and second cooling elements 45 and 50 to dissipate heat produced during operation of the energy storage module 20 in a particularly efficient manner. The energy storage module 20 is arranged between the first and second cooling elements 45 and 50. Furthermore, the cooling device 35 has a cooling plate 55. The first and second cooling elements 45 and 50 are connected both mechanically and thermally to the cooling plate 55. The cooling elements 45, 50 are arranged on a common side of the cooling plate 55. In this case, the cooling elements 45, 50 can also be in the form of transverse struts of a frame of the energy store 10. In this configuration, the cooling element 45, 50 is designed to absorb mechanical forces, for example acceleration forces, that act on the energy storage module 20. The cooling plate 55 also can be part of the frame. A further cooling plate may be provided at the top in FIG. 5 and may be connected thermally and mechanically to the cooling elements 45, 50.

The cooling element 45, 50 preferably contains aluminum, but may be formed from another material. The cooling element 45, 50 surrounds a hollow space 60 so that the cooling element 45, 50 is both stiff and lightweight. However, the hollow space 60 may be dispensed with in some embodiments.

The cooling device 35 has first and second spring fins 65 and 70 that are substantially identical in this embodiment. However, the first and second spring fins 65 and 70 may be configured differently from one another. The second spring fin 70 is arranged on a side of the second cooling element 50 that faces the first spring fin 65.

The first spring fin 65 is connected to the first cooling element 45 and is arranged between the first cooling element 45 and the energy storage module 20. Similarly, the second spring fin 70 is connected to the second cooling element 50 and is arranged between the energy storage module 20 and the second cooling element 50. In this case, a first spring fin 65 and a second spring fin 70 are provided for each energy storage cell 25. The spring fins 65, 70 in each such pair are arranged at substantially the same level on oppositely facing sides of the cooling elements 45, 50. In this case, the energy storage cell 25 is arranged between the two opposite spring fins 65, 70.

Each spring fin 65, 70 is in the form of a leaf spring and is arranged to be prestressed between the respective cooling element 45, 50 and the energy storage cell 25. This ensures reliable physical contact between the spring fins 65, 70 and the energy storage cell 25 and also between the spring fins 65, 70 and the cooling elements 45, 50. Thus, heat is transferred reliably from the energy storage cell 25 to the spring fins 65, 70 and from the spring fins 65, 70 to the cooling element 45, 50 for transporting heat from the energy storage cell 25 to the cooling element 45, 50. Heat is transferred further from the cooling elements 45, 50 to the cooling plate 55. A support element 72 is provided between the cooling plate 55 and an end surface 71 of the energy storage module 20. The support element 72 bears alternately against the cooling plate 55 and the end surface 71 of the energy storage module 20 and therefore thermally connects the energy storage module 20 to the cooling plate 55 to achieve improved cooling of the energy storage module 20.

Each spring fin 65, 70 preferably contains steel or copper, but may be formed from or may comprise another material. The choice of steel and/or copper ensures that the spring fins 65, 70 are mechanically stable and resilient and further ensures that the spring fins 65, 70 exhibit good thermal conductivity for transporting the heat away from the energy storage cell 25 to the cooling element 45, 50.

Each spring fin 65, 70 is connected to the cooling element 45, 50 by an interlocking connection, but may be connected to the cooling element 45, 50 in another way.

Each spring fin 65, 70 is substantially identical over its entire longitudinal extent (which runs perpendicular to the plane of FIG. 6) and has a first section 75, a second section 80 and a third section 85. The second section 80 adjoins the first and second sections 75, 85. The first section 75 and the third section 85 are rectilinear and are oriented parallel to a side surface 90 of the cooling element 45, 50 that faces the energy storage module 20. The second section 80 is predominantly arcuate and, in this example, has rectilinear contour in the region adjoining the first and third sections 75 and 85.

Figure 5:
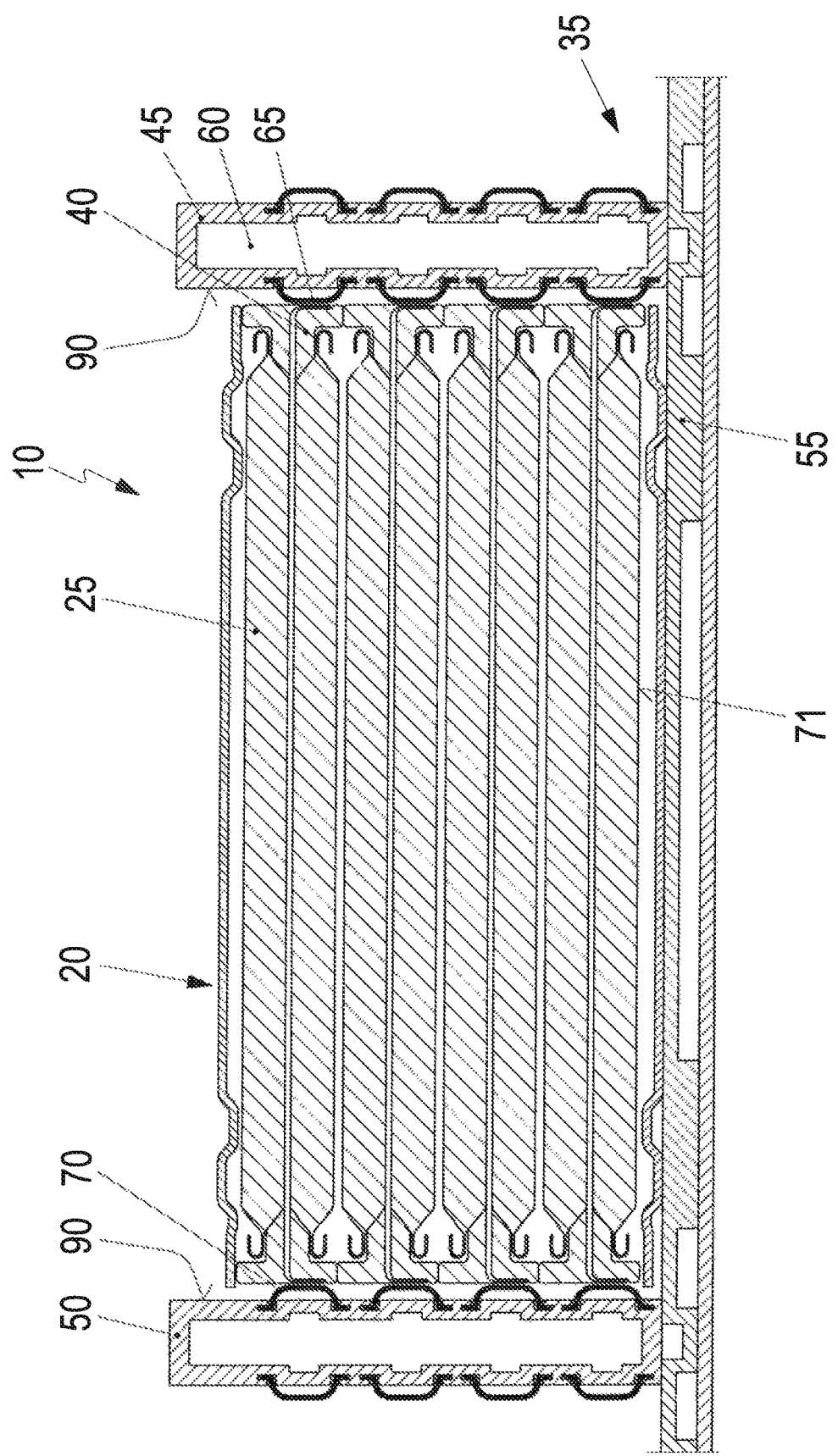
FIG. 5 is a sectional view through the energy store shown in FIGS. 1 and 2.
Figure 6:
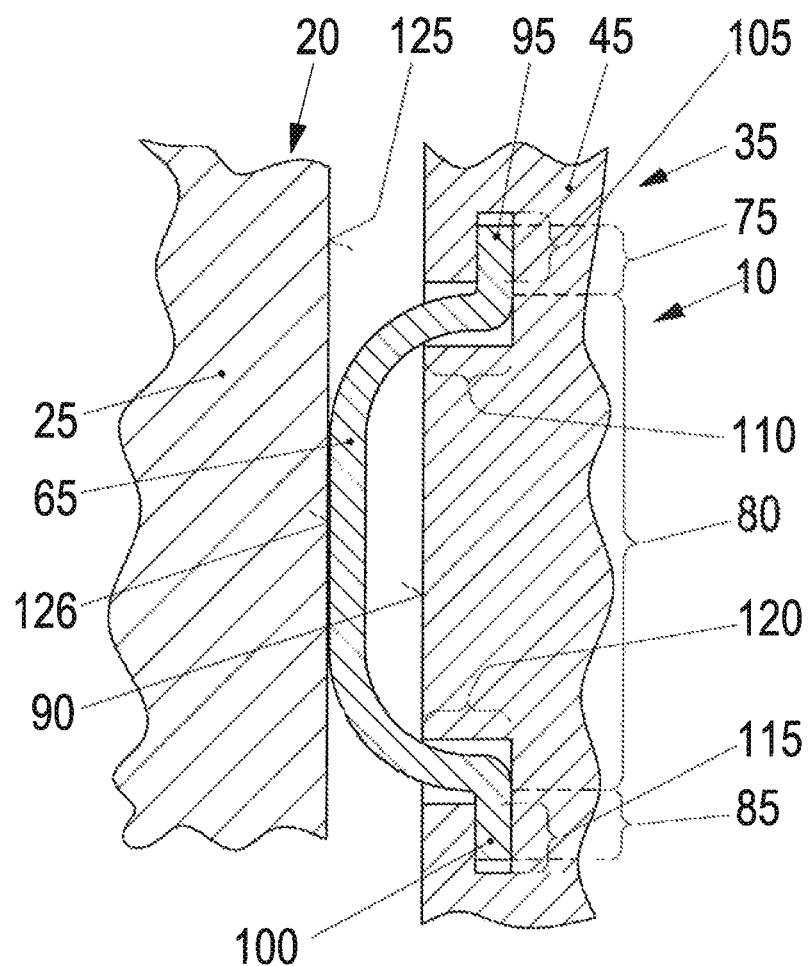
FIG. 6 is a detail of the sectional view of the energy store of FIG. 5.

The cooling element 45, 50 has first and second spaced apart receptacles 95 and 100 that run perpendicular to the plane of the drawing of FIGS. 5 and 6. The first receptacle 95 has first and second receptacle sections 105 and 110 that are substantially perpendicular to one another. The first receptacle section 105 is substantially parallel to the side surface 90, but may be oriented in another way. It is also feasible for the second receptacle section 110 to be oblique to the first receptacle section 105.

The second receptacle 100 has a third and fourth receptacle sections 115 and 120 that are substantially perpendicular to one another. The third receptacle section 115 is substantially parallel to the side surface 90 of the cooling element 45, 50, but may be oriented in another way. The fourth receptacle section 120 is substantially perpendicular to the side surface 90 and to the third receptacle section 115. The first and third receptacle sections 105 and 115 extend in opposite directions from the second receptacle section 110 and from the fourth receptacle section 120.

The first section 75 of the spring fin 65, 70 engages in the first receptacle section 105. The third section 85 of the spring fin 65, 70 engages into the third receptacle section 115.

The second section 80 extends from the first and second sections 75 and 85 in the direction of the energy storage module 20. In the mounted state, the second section 80 makes contact partially by way of a contact surface 126 that faces a side surface 125 of the energy storage module 20, on account of the spring fin 65, 70 being configured in the manner of a leaf spring.

The above-described configuration has the advantage that during production, the cooling elements 45, 50 are mounted on the cooling plate 55, and then the spring fins 65, 70 can be inserted into the receptacles 95, 100 in the direction perpendicular to the plane of the drawing in FIGS. 1, 5 and 6. The energy storage module 20 then is inserted in the direction perpendicular to the plane of the drawing. As a result, assembly of the energy store 10 is particularly simple and cost-effective. The spring fins 65, 70 are pushed apart when the energy storage module 20 is inserted. The initially arcuate second section 80 is deformed elastically and the spring fin 65, 70 is braced when the energy storage module 20 is inserted. Thus, the contact surface 126 of the second section 80 bears substantially flat against the side surface 125 of the energy storage module 20 to ensure a high level of heat transfer between the energy storage module 20 and the spring fin 65, 70. Similarly, the corresponding design of the first section 75 to the first receptacle section 105 and of the third receptacle section 115 to the third section 85 ensures flat physical contact between the cooling element 45, 50 and the spring fin 65, 70. Thus, heat from the energy storage module 20 is introduced into the spring fin 65, 70 and can be discharged reliably to the cooling element 45, 50.

In addition, tolerance compensation between the energy storage module and the cooling elements 45, 50 can be performed in this case. The energy storage module 20 is connected thermally to the cooling element 45, 50 by the physical contact between the spring fin 65, 70 and the side surface 125 of the energy storage module 20.

The above-described configuration has the advantage that viscous adhesive fillers, which are also called gap fillers, can be dispensed with. In addition, after the service life of the energy storage module 20 has expired, the energy storage module 20 can be removed in a simple manner in this way, without the energy store 10 having to be destroyed or the filler having to be removed in the process. Furthermore, the total mass of the energy store 10 is reduced in comparison to energy stores with plastic-like fillers.

Figure 7:
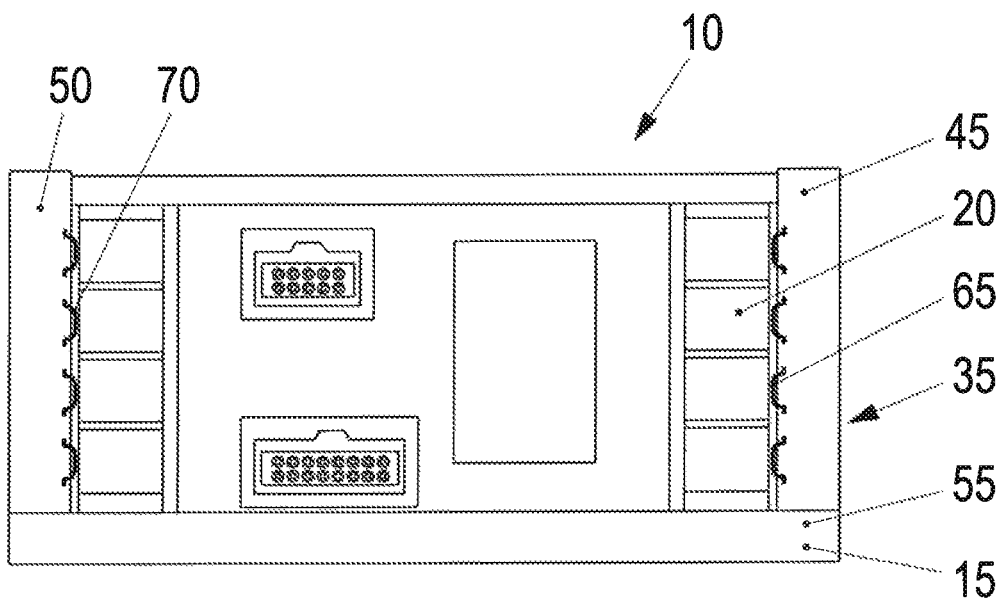
FIG. 7 is a plan view of an energy store of a second embodiment.

FIG. 7 is a plan view of an energy store 10 of a second embodiment. The energy store 10 is substantially identical to the energy store 10 of FIGS. 1 to 6, but the receptacles 95, 100 in the cooling element 45, 50 are not present in FIG. 7. In this case, each spring fin 65, 70 is connected to the cooling element 45, 50 via the first and/or third section 75, 85 in a cohesive manner, such as a welded connection. In this way, the cooling element 45, 50 can be produced in a simple and cost-effective manner. The manner of operation then corresponds to the manner of operation of the cooling device 35 in FIGS. 1 to 6. Furthermore, it is of course also feasible for the configuration of the energy store described in FIG. 7 to be combined with the energy store 10 described in FIGS. 1 to 6.

What is claimed is:

1. A cooling device for cooling an energy storage module of an energy store, comprising:
    at least one cooling element having pairs of parallel grooves; and
    elongate spring fins corresponding in number to the pairs of parallel grooves, each of the elongate spring fins having a longitudinal extent that extends parallel to the pairs of parallel grooves, each of the elongate spring fins having a pair of elongate sections inserted along an inserting direction extending parallel to the pairs of parallel grooves so that the pair of the elongate sections of the each of the elongate spring fins engage respectively in the pairs of parallel grooves formed in the at least one cooling element, the each of the elongate spring fins further having an intermediate section adjoining the pair of elongate sections of the respective spring fin, the intermediate sections of the each of the elongate spring fins being spaced from the at least one cooling element and prestressed against the energy storage module so that the intermediate sections of the each of the elongate spring fins carry heat from the energy storage module to the at least one cooling element.

2. The cooling device of claim 1, wherein the pair of elongate sections that are engaged in the grooves of one of the pairs of parallel grooves have sections that are substantially rectilinear.

3. The cooling device of claim 2, wherein the intermediate section of the each of the elongate spring fins is arcuate.

4. The cooling device of claim 1, further comprising at least one cooling plate, the at least one cooling element being connected to the at least one cooling plate, so that the energy storage module is coupled thermally to the at least one cooling plate.

5. The cooling device of claim 1, wherein the at least one cooling element has a first surface, and the pairs of parallel grooves being formed in the first surface, each of the grooves in the pairs of parallel grooves having an entrance section intersecting the first surface of the at least one cooling element and a base section spaced from the first surface of the at least one cooling element, the elongate sections of the each of the elongate spring fins being engaged in the entrance sections and the base sections of the respective grooves in the pairs of parallel grooves.

6. The cooling device of claim 5, wherein the base sections of the grooves in the pairs of parallel grooves are substantially parallel to the first surface of the at least one cooling element.

7. The cooling device of claim 1 wherein the at least one cooling element surrounds a hollow space.

8. The cooling device of claim 1, wherein the each of the elongate spring fins is substantially identical over its entire longitudinal extent.

9. An energy store comprising:
    an energy storage module that has at least one energy storage cell; and
    the cooling device of claim 1, wherein the each of the elongate spring fins carry heat from the energy storage module to the cooling element.

* * * * *